US011718142B2

(12) United States Patent
Pecchia et al.

(10) Patent No.: US 11,718,142 B2
(45) Date of Patent: Aug. 8, 2023

(54) APPARATUS AND METHOD FOR SANITIZING A VEHICLE INFERIOR

(71) Applicant: Ford Global Technologies, LLC, Dearborn, MI (US)

(72) Inventors: Zachary Alan Pecchia, Plymouth, MI (US); Robert D. Bedard, Allen Park, MI (US); James Alan Acre, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 16/953,051

(22) Filed: Nov. 19, 2020

(65) Prior Publication Data

US 2022/0153084 A1 May 19, 2022

(51) Int. Cl.
*B60H 1/00* (2006.01)
*B60H 3/02* (2006.01)

(52) U.S. Cl.
CPC ......... *B60H 1/00064* (2013.01); *B60H 3/02* (2013.01); *B60H 1/00678* (2013.01); *B60H 2001/002* (2013.01); *B60H 2001/003* (2013.01); *B60H 2001/00107* (2013.01)

(58) Field of Classification Search
CPC .. B60H 3/0021; B60H 3/0028; B60H 3/0092; B60H 1/00007; B60H 3/02; B60H 3/0007; B60H 1/3207; B60H 1/3202; B60H 2003/005; B60H 1/00064; F24F 3/16; F24F 8/20; F24F 8/24; F24F 8/00; F24F 8/22; F24F 8/26; F24F 8/27; F24F 8/30; F24F 8/40; F24F 8/50; F24F 8/60; F24F 8/70; F24F 8/80; F24F 8/95; B60S 1/62
See application file for complete search history.

(56) References Cited

U.S. PATENT DOCUMENTS

| | | | |
|---|---|---|---|
| 6,553,777 B2 * | 4/2003 | Dillenback | A61L 9/14 222/1 |
| 8,327,652 B2 | 12/2012 | Nakaguro | |
| 10,220,108 B2 | 3/2019 | Brown et al. | |
| 11,187,422 B1 * | 11/2021 | Richards | B01D 35/06 |

(Continued)

FOREIGN PATENT DOCUMENTS

| | | | | |
|---|---|---|---|---|
| EP | 1519118 A1 * | 3/2005 | | B60H 3/022 |
| FR | 2720340 A1 * | 12/1995 | | B60H 3/0085 |

OTHER PUBLICATIONS

FR-2720340-A1 English Machine Translation (Year: 1995).*

(Continued)

*Primary Examiner* — Jenna M Hopkins
(74) *Attorney, Agent, or Firm* — Vichit Chea; Price Heneveld LLP

(57) ABSTRACT

A motor vehicle includes a passenger space and a HVAC system. The HVAC system includes a heater, an air conditioner, and ducts configured to heat and/or cool air to the passenger space. The HVAC system is configured to increase humidity of air while the air is flowing through the HVAC system, and to introduce a sanitizing agent into air while the air is flowing through the HVAC system. A controller is configured to actuate the HVAC system to circulate humidified air containing the sanitizing agent through the passenger space to neutralize pathogens that may be present in the passenger space.

20 Claims, 4 Drawing Sheets

(56) References Cited

U.S. PATENT DOCUMENTS

| | | | |
|---|---|---|---|
| 2004/0065107 A1* | 4/2004 | Bas | B60H 3/0092 62/304 |
| 2004/0141875 A1 | 7/2004 | Doshi | |
| 2006/0008379 A1 | 1/2006 | Mielnik et al. | |
| 2009/0193821 A1* | 8/2009 | Ozeki | B60H 1/00742 62/157 |
| 2013/0239599 A1* | 9/2013 | Pursifull | B60H 1/00849 62/115 |
| 2014/0303835 A1* | 10/2014 | VerWoert | B60H 1/00842 701/36 |
| 2017/0100989 A1 | 4/2017 | Chapaton et al. | |
| 2017/0197493 A1 | 7/2017 | Paranhos et al. | |
| 2019/0084381 A1 | 3/2019 | Daniel et al. | |
| 2019/0091738 A1 | 3/2019 | Chen | |
| 2020/0198444 A1 | 6/2020 | Schmidt et al. | |
| 2020/0198445 A1 | 6/2020 | Line et al. | |

OTHER PUBLICATIONS

EP-1519118-A1 English Machine Translation (Year: 2005).*

Buchholz, K. "Magna Fighting COVID-19 With Ozone," SAE International, Apr. 15, 2020, pp. 1-3, Web., <https://www.sae.org/news/2020/04/magna-puro-is-fighting-covid-19-with-ozone?_ga=2.117622473.1301304013.1598970946-1918426947.1594332083>.

Chan, K.H. et al., "The Effects of Temperature and Relative Humidity on the Viability of the SARS Coronavirus," Advances in Virology, vol. 2011, Art. ID 734690, Jul. 31, 2011, pp. 1-7, Web., <https:doi:10.1155/2011/734690>.

Cooley, Brian, "Clean Your Car With the Right Stuff to Fight Viruses and Germs," Roadshow by CNET, Apr. 17, 2020, pp. 1-6, Web., <https://www.cnet.com/roadshow/news/coronavirus-covid-19-virus-car-tech-germs-hepa-ultraviolet-clean/>.

"Polytech Auto Fog Sterilize Treatment," Polytech, Sep. 2020, pp. 1-5, Web., <http://www.polytechwm.com/auto-fog-sterilize-treatment/>.

* cited by examiner

APPARATUS AND METHOD FOR SANITIZING A VEHICLE INFERIOR

FIELD OF THE DISCLOSURE

The present disclosure relates to a motor vehicle including a heating, ventilation, and air conditioning (HVAC) system with integrated interior sanitizing capabilities and, in particular, to a HVAC system configured to provide a sanitizing cycle that may include introducing a sanitizing agent into air while controlling heat and/or humidity in a vehicle interior to neutralize pathogens that may be present in the vehicle interior.

BACKGROUND OF THE DISCLOSURE

Motor vehicles may include a HVAC system that heats and/or cools air in a vehicle interior. Known HVAC systems may include a fresh air inlet and a recirculating air inlet, and a feature to select between the two. Air flowing through the system may be cooled by an evaporator of an AC system and/or heated by a heater core. The air may exit the HVAC system into a passenger compartment from one or more outlets.

SUMMARY OF THE DISCLOSURE

One aspect of the present disclosure is a motor vehicle including a passenger space and a HVAC system. The HVAC system includes a heater, an air conditioner, and ducts configured to supply air that has been heated and/or cooled by the heater and/or the air conditioner to the passenger space and/or another space of the vehicle. The HVAC system may be configured to increase humidity of air in the HVAC system and to introduce a sanitizing agent (e.g., a chemical anti-microbial/anti-viral) into the air before the air is supplied to the passenger space and/or other space. The motor vehicle may include a controller that is configured to actuate the HVAC system and the sanitizer to circulate humidified and/or heated air containing the chemical sanitizing agent through the passenger space and/or other space.

Embodiments of the first aspect of the present disclosure can include any one or a combination of the following features:

- The HVAC system may include a user interface that is configured to permit a user to schedule a sanitizing cycle that includes actuating the HVAC system to circulate humidified air containing a sanitizing agent (e.g., a chemical) through the passenger space.
- The user interface may be configured to permit a user to select one of a plurality of sanitizing cycles having non-equal time durations.
- The HVAC system may include a fresh air inlet and a recirculation inlet.
- The controller may be configured to cause the HVAC system to conduct a sanitizing cycle only if the passenger space is not occupied.
- The sanitizing cycle may include: a) causing air from the passenger space to flow into the recirculation inlet, b) actuating the heater core to heat air flowing through the HVAC system, c) causing the HVAC system to increase humidity of air flowing through the HVAC system and/or introduce a chemical sanitizing agent into air flowing through the HVAC system.
- During a sanitizing cycle, a temperature and/or a humidity of air from the passenger space may be increased while the air is flowing through the HVAC system, and a chemical sanitizing agent may be introduced into the air while the air is flowing through the HVAC system, before the air is returned to the passenger space.
- The HVAC system may include a heater core, and the vehicle may include a reservoir that is configured to hold a sanitizing agent (e.g., a chemical) that is in liquid form. The reservoir may be fluidly connected to a liquid outlet that is located adjacent an upstream side of the heater core.
- Liquid from the reservoir exiting the liquid outlet may be heated to facilitate evaporation.
- The liquid outlet may be configured to cause at least some liquid exiting the liquid outlet to contact the heater core.
- The liquid outlet may comprise an evaporating surface that is connected to the heater core by a thermal conductor whereby the heater core heats the evaporating surface to evaporate liquid.
- The system may include a fluid conduit that is fluidly connected to the reservoir and the liquid outlet. The fluid conduit may extend along a surface of the heater core whereby liquid flowing through the fluid conduit is heated by the heater core before the liquid reaches the liquid outlet.
- The system may include a valve that is configured to control flow of liquid from the reservoir to the liquid outlet, and the controller may be configured to open the valve and cause liquid to flow from the liquid reservoir to the liquid outlet when the heater core is actuated to heat air flowing to the passenger space.
- The HVAC system may include an air outlet that provides air to the passenger space. The vehicle may include a reservoir configured to hold a sanitizing liquid that includes a chemical sanitizing agent, and a fluid conduit connecting the reservoir to a mister positioned in the air outlet. The mister may comprise an ultrasonic mister, a spray mister, or a combination thereof.
- The HVAC system may be configured to introduce a fragrance and/or a deodorizing agent into air flowing through the HVAC system before the air enters the passenger compartment and/or another space of the vehicle.
- The controller may be configured to utilize measured temperature and humidity data (e.g., sensor data) of air in the passenger compartment to control temperature and humidity of air in the passenger compartment.
- The controller may be configured to utilize artificial intelligence (AI) to learn and predict user preferences, and the controller may be configured to utilize the user preferences to control at least one aspect of the HVAC system.

Another aspect of the present disclosure is a method of sanitizing a passenger space and/or other space of a motor vehicle utilizing a HVAC system of the motor vehicle. The method includes determining temperature and humidity of air in the passenger space, and causing air to flow through the HVAC system and exit into the passenger space and/or other space. The method further includes increasing one or both of temperature and humidity of air exiting into the passenger space and/or other space utilizing measured temperature and/or humidity data of air in the passenger space and/or other space and predefined sanitizing criteria. The method further includes introducing a sanitizing agent (e.g., a chemical) into air flowing through the HVAC system before the air exits into the passenger space and/or other space.

Embodiments of the second aspect of the present disclosure can include any one or a combination of the following features:

The method may include utilizing a drip outlet adjacent to a heater core to introduce a liquid chemical sanitizing agent into air flowing through the HVAC system before the air enters the passenger space.

The predefined sanitizing criteria may include a target temperature and a target humidity. The method may further include causing the HVAC system to increase at least one of air temperature and humidity in the passenger space if at least one of measured temperature and humidity data are less than the target temperature and humidity, respectively.

The method may include utilizing the predefined sanitizing criteria to control an amount of a sanitizing agent (e.g., a chemical) introduced into air flowing through the HVAC system.

The predefined sanitizing criteria may include at least one of: a) a pathogen susceptibility to the chemical sanitizing agent, b) an estimated (or measured) amount of a pathogen present in the passenger space, c) a susceptibility of a passenger to a pathogen, d) a temperature of air in the passenger space, e) a humidity of the air in the passenger space, and f) an estimated concentration of a pathogen in the geographic area of the vehicle.

The method may include utilizing a mister that is positioned in a duct of the HVAC system adjacent an air outlet to introduce a liquid chemical sanitizing agent into the air before the air enters the passenger space.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
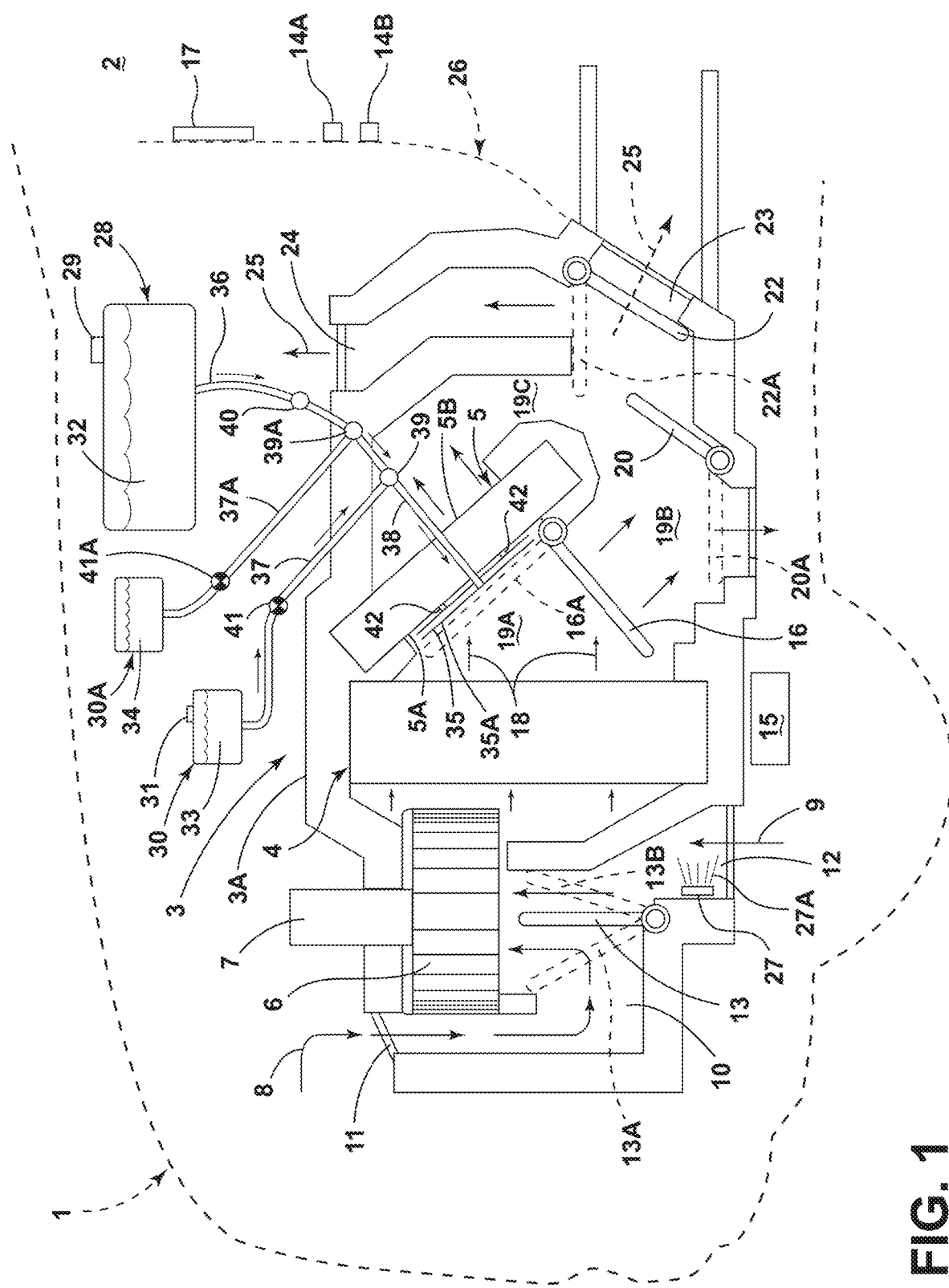
FIG. 1 is a partially fragmentary schematic view of a HVAC system having integrated sanitizing features including a liquid outlet.

Additional features and advantages of the present disclosure will be set forth in the detailed description which follows and will be apparent to those skilled in the art from the description, or recognized by practicing the invention as described in the following description, together with the claims and appended drawings.

As used herein the term "or" is not an exclusive or. For example, an item including A or B may include A alone, B alone, or both A and B.

As used herein, the term "and/or," when used in a list of two or more items, means that any one of the listed items can be employed by itself, or any combination of two or more of the listed items can be employed. For example, if a composition component, or assembly, is described as containing components A and/or B and/or C, the composition component, or assembly, can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

As used herein the terms "the," "a," and "an," mean "at least one," and should not be limited to "only one" unless explicitly indicated to the contrary. Thus, for example, reference to "a component" includes embodiments having only one such component and embodiments having two or more such components unless the context clearly indicates otherwise.

A motor vehicle 1 includes an interior compartment or space 2 and a HVAC system 3. The interior space 2 may comprise a passenger compartment or other interior space. The HVAC system 3 may include a duct system 10 that may be formed, at least in part, by a housing 3A of HVAC system 3, an air conditioning system including an evaporator 4, and a heater including a heater core 5. The air conditioning (AC) system may comprise a conventional system, including a condenser, compressor, and other components (not shown) in addition to the evaporator 4. The heater core 5 may be fluidly connected to a source of hot water, such as an internal combustion engine, electric water heater, or other suitable heat source (not shown) in a known manner. It will be understood that the HVAC system 3 may include virtually any suitable device or system for heating and/or cooling air (e.g., electrically-powered), and the present disclosure is not limited to a conventional evaporator 4 and heater core 5. Also, vehicle 1 may comprise a conventional operator controlled vehicle, or it may comprise an autonomous vehicle. Also, motor vehicle 1 may have its own engine (e.g., an internal combustion engine and/or an electric motor) or it may comprise a pod, train, or the like that utilizes pneumatic or magnetic propulsion. Still further, the vehicle may comprise a trailer or the like that does not include a passenger compartment.

The HVAC system 3 may include a fan 6 that is driven by a motor 7 to draw in fresh air 8 through fresh air inlet 11, or recirculated air 9 through recirculation inlet 12. Fresh air inlet 11 may be fluidly connected to the air outside of motor vehicle 1, and recirculating air inlet 2 may be fluidly connected to the passenger compartment 2. A powered door 13 may be operably connected to a controller 15, whereby the powered door 13 can be moved between a first position 13A blocking fresh air inlet 11 and a second position 13B blocking recirculation inlet 12. Controller 15 may comprise virtually any suitable programmable controller (PLC), circuit, software, and/or combinations thereof. Door 13 may, alternatively, be manually movable between positions 13A and 13B utilizing mechanical linkage and a user-movable input member (not shown). One or more sensors, such as a humidity sensor 14A and a temperature sensor 14B, may be positioned in passenger space 2 and/or recirculation inlet 9. The sensors 14A and 14B may be operably connected to the controller 15 to provide the controller 15 with measured temperature and/or humidity data of air in passenger space 2. As also discussed in more detail below, a user input or interface 17 may be operably connected to controller 15 to permit a user to input settings or requests to controller 15. Interface 17 may optionally include a screen to display messages and/or receive user inputs and/or a microphone and/or a speaker to provide audio input and output. As discussed in more detail below, controller 15 may be configured to cause first powered door 13 to close off fresh air inlet 11, thereby drawing air 9 from passenger space 2 during a sanitizing cycle.

As discussed in more detail below, controller 15 may be configured to implement one or more sanitizing cycles, which may include causing first powered door 13 to close off fresh air inlet 11, thereby drawing air 9 from passenger space 2.

The HVAC system 3 may further include a second powered door 16 that is configured to cause air 18 downstream of evaporator 4 to flow through a duct region 19A, whereby the air is heated by heater core 5. Alternatively, the second powered door 16 can be moved to a position 16A to direct air 18 into a duct area 19B to thereby bypass the heater core 5. It will be understood that second powered door 16 may comprise a conventional blend door or the like, and may be positioned at various intermediate positions between the first and second positions to thereby cause some air to flow around heater core 5 while some of the air bypasses heater core 5 and flows through duct region 19B, whereby the heated and non-heated air is mixed in the duct region 19C.

The HVAC system may also include third and fourth powered doors 20 and 22. When third powered door 20 is in a closed position 20A, the third powered door 20 closes off a floor outlet 21. Fourth powered door 22 closes off a panel outlet 23 when in a first position and closes off a defrost outlet 24 when in a second position 22A. Floor outlet 21 may be configured to provide treated air 25 to a floor space of passenger compartment 2, and panel outlet 23 may be configured to provide treated air 25 at an intermediate height (e.g., a dashboard 26). Defrost outlet 24 may be configured to provide treated air 25 to a windshield area. In general, the powered doors 13, 16, 20, and 22 may be controlled by controller 15 or other suitable arrangements as generally known in the art. It will be understood that the HVAC system 3 does not necessary need to include the floor outlet 21, panel outlet 23, and defrost outlet 24. Also, it will be understood that the floor outlet 21 may comprise two or more outlets (e.g., one in a driver's footwell area, and a second in a passenger's footwell area). Similarly, the panel outlet 25 could comprise a plurality of outlets (e.g., two in a driver's space, and two in a passenger's space). Similarly, the defrost outlet 24 may comprise one or more outlets as required for a particular application. The HVAC system may comprise virtually any suitable system heating and/or cooling system that heats and/or cools air supplied to passenger space 2.

The vehicle may further include a reservoir 28 that is configured to store liquid water 32. Reservoir 28 includes an inlet 29 to permit the reservoir 28 to be filled with water. The system may further include a reservoir 30 that is configured to retain a liquid (e.g., chemical) sanitizing agent 33. The reservoir 30 includes an inlet 31 that can be utilized to fill reservoir 30 with the liquid sanitizing agent 33. Water 32 and/or liquid sanitizing agent 32 may be supplied to a drip outlet 35 that is positioned adjacent heater core 5. It will be understood that "drip" outlet 35 may comprise virtually any liquid outlet, and liquid exiting drop outlet 35 may exit (flow out) in virtually any manner, and the liquid does not necessarily "drip." Rather, the term "drip outlet" generally designates a low pressure outlet that does not, by itself, generate a spray or mist.

Water 32 from reservoir 28 may flow through a conduit 36 to a junction 39. The flow of water through conduit 36 may be controlled by powered valve 40 that is operably connected to controller 15. Liquid sanitizing agent 33 from reservoir 30 flows through conduit 37 to junction 39. The flow of liquid sanitizing agent 33 through conduit 37 may be controlled by a powered valve 41 that is operably connected to controller 15. Water 32 and/or liquid sanitizing agent 33 mixes at fluid junction 39, and it flows through conduit 38 to drip outlet 35.

As discussed in more detail below, the controller 15 may be configured to control an amount of water (volume) 32 supplied to drip outlet 35 to thereby control a humidity of the air in passenger space 2, and controller 15 may also be configured to control an amount (volume) of liquid sanitizing agent 33 supplied to drip outlet 35 to thereby control an amount of the sanitizing agent that is introduced into the air in passenger space 2. Drip outlet 35 may comprise a flat mesh or mat structure 33A (e.g., a non-woven mat) having an increased surface area (evaporating surface), whereby water 32 and/or sanitizing agent 33 flow over the mesh or mat 33A evaporating surface to facilitate evaporation of the water 32 and/or liquid sanitizing agent 33. The drip outlet 35 may optionally be made from a material (e.g., metal) having high heat conductivity, and the drip outlet 35 may optionally be thermally connected to heater core 5 by one or more thermal bridges 42 that are also made of metal or other heat-conducting material, whereby the drip outlet 35 is heated by the heater core 5 to facilitate evaporation of water 32 and/or liquid sanitizing agent 33 as the liquid flows over an evaporating surface 35A of drip outlet 35. In the illustrated example, the drip outlet 35 is positioned on an upstream side 5A of heater core 5. However, the drip outlet 35 may also be positioned adjacent to downstream side 5B of heater core 5. Furthermore, drip outlet 35 may include portions that are positioned on both upstream side 5A and downstream side 5B of heater core 5. Also, it will be understood that drip outlet 35 may comprise a single opening, or it may comprise multiple openings that distribute liquid over an evaporating surface 35A. For example, drip outlet 35 may comprise a tube having a large number of small perforations to distribute water 32 and/or liquid sanitizing agent 33 over a large evaporating surface 35A.

Vehicle 1 may further include a reservoir 30A that is configured to retain a fragrance, water, sanitizer, essential oil, a deodorizing agent, or other such liquid or combinations thereof. Reservoir 30A may be fluidly connected to conduit 36 by a fluid conduit 37A, and the flow of liquid from reservoir 30A may be controlled by powered valve 41A. A junction 39A fluidly connects conduit 37A and conduit 36. Valve 41A may be operably connected to controller 15 to control flow of liquid 34 from reservoir 30A. As discussed in more detail below, liquid 34 from reservoir 30A may be introduced into air flowing through the HVAC system 3 when the vehicle is occupied (i.e., not during a sanitizing cycle), or optionally during a sanitizing cycle.

If the reservoirs 28, 30, and 30A are positioned above drip outlet 35 as shown in FIG. 1, gravity may provide sufficient flow of liquid. However, one or more powered pumps (e.g., similar to pump 49 of FIG. 2) may optionally be connected to one or more conduits to provide pressurized flow from one or more reservoirs 28, 30, and 30A.

The system may optionally include a UV light source 27 that produces UV light 27A to sanitize air flowing through the HVAC system. The light 27A is preferably a UV-C light. The UV-C light source 27 may be positioned in recirculation inlet 12 or other suitable location to treat air flowing through HVAC system 3. In general, the UV light 27A is selected to have a wavelength and power sufficient to neutralize viruses, microbes, and other such pathogens present on surfaces or in air.

Figure 2:
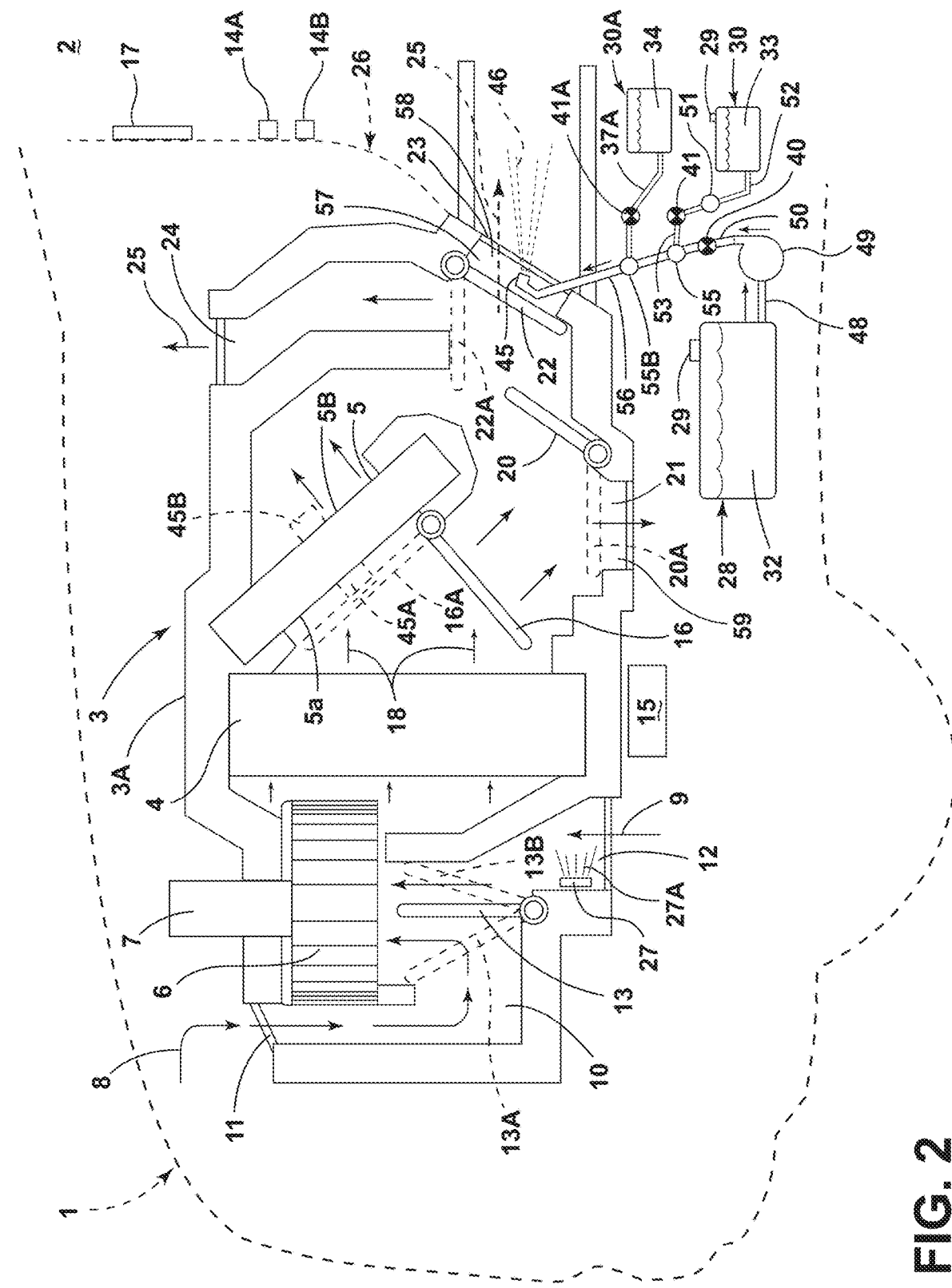
FIG. 2 is a partially fragmentary schematic view of a HVAC system having integrated sanitizing features including a mister.

With further reference to FIG. 2, motor vehicle 1 may include a mister nozzle 45 positioned in one or more of the outlets 21, 23, and 24 to provide water 32 and/or liquid sanitizing agent 33 in the form of mist 46 that is introduced into treated air 25 before the treated air 25 exits panel outlet 23 into passenger space 2. The HVAC system 3 of FIG. 2 may be substantially similar to the HVAC system 3 described in more detail above in connection with FIG. 1. A water reservoir 28 is fluidly connected to a powered pump 49 by fluid conduit 48, and the flow of water through conduit 48 and conduit 50 may be controlled by powered pump 49 and/or an optional powered valve 40. Similarly, liquid sanitizing agent 33 may flow through conduits 52 and 53, and the flow of the liquid sanitizing agent 33 may be controlled by a powered pump 51 and/or powered valve 41, which are fluidly connected to the conduit sections 52-54. The water 32 and liquid sanitizing agent 33 may be mixed at a junction 55, and the resulting mixture flows to mister nozzle 45 through a conduit 56. As discussed in more detail below, controller 15 may be configured to control the volume of water 32 and liquid sanitizing agent 33 such that a mixture of water 32 and liquid sanitizing agent 33 may be supplied to the mister nozzle 45. Alternatively, the controller 15 may supply only water 32 or only liquid sanitizing agent 33 to the mister nozzle 45, depending on the requirements for the sanitizing cycle and/or the conditions inside passenger space 2.

Mister nozzle 25 is preferably positioned in an outer duct portion 57 of panel outlet 23 behind a vent screen 58 (e.g., movable slats or louvers), which are also inside of a boundary 23A of panel outlet 23. Boundary 23A may comprise an imaginary flat or curved "surface" corresponding to the transition between a duct and the passenger space 2. Similarly, if mister nozzle 45 is positioned in floor outlet 21, the mister nozzle 45 is preferably positioned in an outer portion 59 inside boundary plane 21A of floor outlet 21. If a mister nozzle 45 is positioned in defrost outlet 24, the mister nozzle 45 is preferably positioned in outer duct portion 60, wherein the mister nozzle 45 does not protrude outwardly beyond the boundary 24A of defrost outlet 24A. Mister nozzles 45 may be positioned in one or more of the outlets 21, 23, and 24. During a sanitizing cycle, the outlets that do not include a mister nozzle 45 may be closed. For example, if a mister nozzle 45 is located in the panel outlet 23, as shown in FIG. 2, the powered door 20 may be moved to a closed position 20A to prevent flow of air from floor outlet 21, and powered door 22 may be moved to a position 22A to prevent flow of air from defrost outlet 24, while causing flow of air from panel outlet 23.

The spray nozzle 45 may comprise an ultrasonic mister or it may comprise a spray mister. Ultrasonic misters and spray misters for humidifying air and/or introducing fragrances, deodorizers, or the like, into air are generally known, and a detailed description of these vaporizers (misters) is therefore not believed to be required. Also, spray nozzle 45A may, optionally, be positioned adjacent an upstream side 45A and/or a downstream side 45B of heater core 5.

Figure 3:
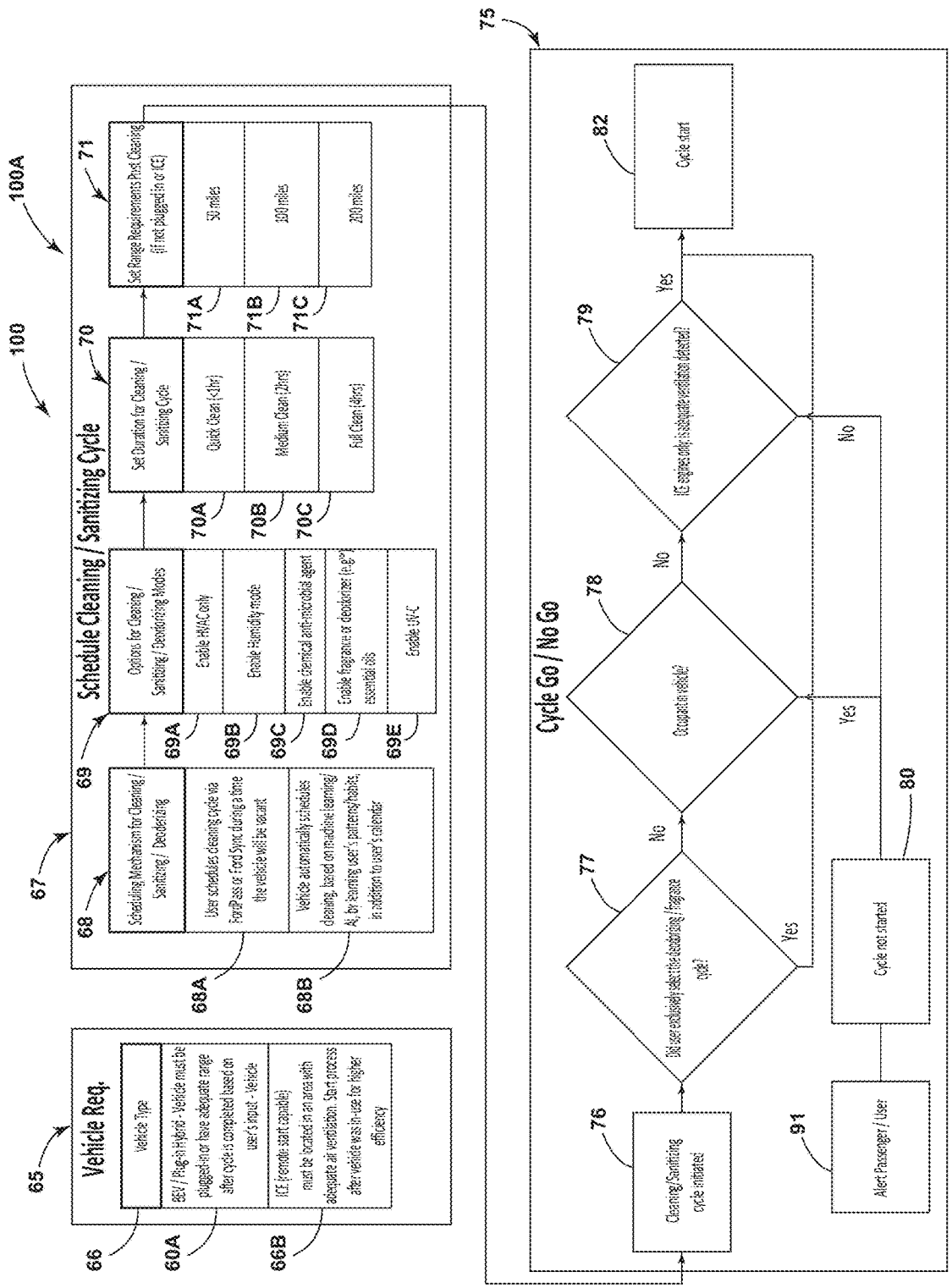
FIG. 3 is a flowchart showing operation of a HVAC system.
Figure 4:
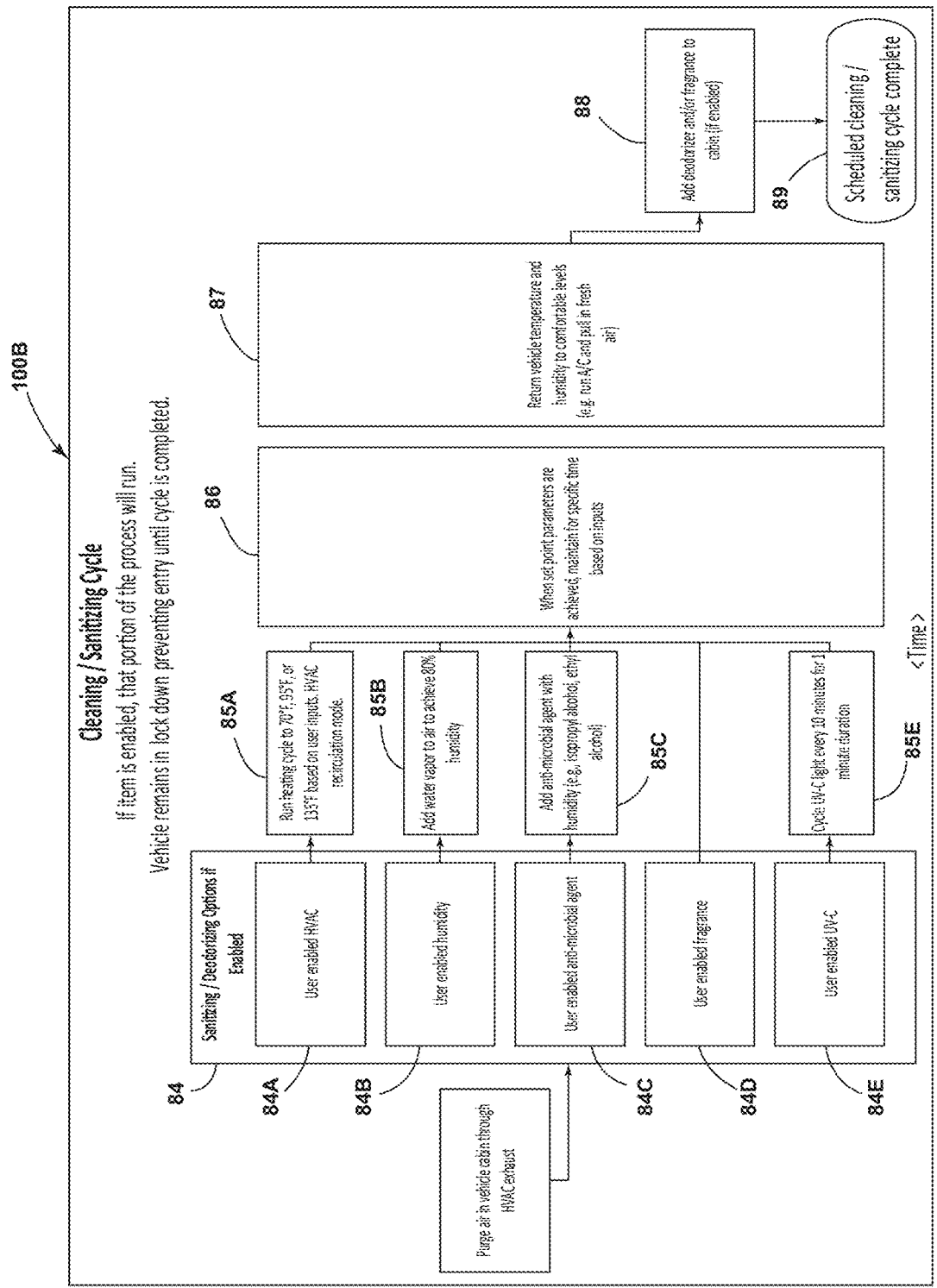
FIG. 4 is a flowchart showing operation of a HVAC system.

With further reference to FIGS. 3 and 4, a flowchart 100 includes a first portion 100A (FIG. 3) and a second portion 100B (FIG. 4). The operations of flowchart 100 may be implemented by controller 15 and/or a user via user input 17. It will be understood that the term "cleaning cycle" generally designates a sanitizing cycle, a deodorizing cycle, or a cycle that includes both sanitizing and deodorizing. Vehicle requirements 65 (FIG. 3) may include a vehicle type 66, which may comprise an electric or hybrid vehicle 66A or a vehicle 66B having an internal combustion engine. If the motor vehicle comprises a hybrid vehicle 66A, the system may be configured to require that the vehicle is plugged in or have adequate range after a cleaning cycle is completed, which may be based on a user's input. For a vehicle 66B, the system (e.g., controller 15) may be configured to require that the vehicle is located in an area with adequate air ventilation, and the system may be configured to start a cleaning cycle after the vehicle has been in use to provide higher efficiency (e.g., heater core 5 has sufficient heat to vaporize water and/or sanitizing agents). The system (e.g., controller 15) may be configured to provide a step 67 for scheduling a cleaning cycle. In general, the cleaning cycle may be scheduled utilizing user interface 17 (FIGS. 1 and 2) and/or artificial intelligence (AI). Specifically, initial scheduling 68 may involve user scheduling 68A or AI scheduling 68B.

Options 69 for sanitizing/deodorizing modes may include enabling HVAC 69A, enabling a humidity mode 69B, enabling a chemical anti-microbial agent 69C, enabling fragrance or deodorizer 69D, and/or enabling UV-C sanitizing. These options may be set by a user via input 17, or by controller 15.

At step 70, the duration of the cleaning cycle is set. The duration may comprise a quick clean 70A (e.g., one hour or less), a medium clean 70B (e.g., about two hours), or a full clean 70C (e.g., four hours or more). It will be understood that additional durations may be utilized, or the system may be configured to implement only a single duration for the cleaning cycle. Also, controller 15 may be configured to determine a cleaning cycle duration based on other factors such as the length of time from a prior cleaning cycle, an alert that a pathogen is present in the geographic region of the vehicle, etc. The duration may be set by a user via user input 17. Alternatively, the duration may be set by controller 15 according to predefined criteria.

At step 71, the range requirements for post-cleaning may be determined if the motor vehicle comprises an electric vehicle that is not plugged in (i.e., not connected to an external electrical power source). Typically, a range requirement is not required if the vehicle comprises a hybrid vehicle or a vehicle powered by an internal combustion engine. The range may be set at, for example, 50 miles (71A), 100 miles (71B), or two miles (71C). The system (e.g., controller 15) may be configured to default to a minimum range requirement (e.g., 100 miles) if a user-selected range is not entered. The range requirement may be set by a user or by controller 15.

A cycle go/no go determination 75 determines if predefined criteria for a cleaning cycle have been met. Once a cleaning cycle has been requested or initiated at step 76, the system 15 determines at 77 if the user selected a cycle involves only deodorizing or fragrance. If yes, the cycle can be run while occupants are in the motor vehicle 1, and the system 15 proceeds to a cycle start 82. If a sanitizing cycle is requested (e.g., by a user or by controller 15), the system determines at 78 if an occupant is in the vehicle. This may be determined utilizing seat weight sensing, a vision system or camera, biometric sensors, a door ajar sensor, an audio sensor, or other such inputs or combinations thereof. If the system 15 detects that occupants are in the passenger space 2, the cycle is not started, as shown at step 80, and an alert to the passenger or occupant of the motor vehicle 81 may be generated (e.g., a message may be displayed on interface 17).

If the system 15 determines at step 78 that the vehicle is not occupied, the system 15 proceeds to step 79. Vehicle 1 may have an autonomous mode, and the system 15 may be configured to permit a sanitizing cycle while vehicle 1 is moving without passengers in passenger space 2. Step 79 is typically only utilized for motor vehicles having internal combustion engines. Step 79 involves determining if adequate ventilation is detected. This can be determined using load sensor data, radar, etc. If adequate ventilation is not present, the cycle is not started as shown at 80, and an alert (audio and/or visual) may be generated, as shown at step 81. If adequate ventilation is detected at step 79, the system 15 proceeds to step 82 and the cycle is started. It will be understood that an electric vehicle system may proceed directly from step 78 to step 82 if the system determines that the vehicle is not occupied at step 78.

With further reference to FIG. 4, if a cycle is started at step 82 (FIG. 3), the system 15 purges air in the vehicle passenger space 2 at step 83 through HVAC exhaust. Specifically, fresh air is drawn into fresh air inlet 11 (FIGS. 1 and 2), and the fresh air is blown into the passenger space 2 while the recirculation inlet 12 is closed, thereby causing air in the passenger space 2 to exit via an HVAC exhaust port of a known type (not shown).

Various sanitizing/deodorizing options may be enabled at step 84. The options may include user-enabled HVAC 84A, user-enabled humidity 84B, user-enabled microbial agent 84C, user-enabled deodorizer or fragrance 84D, and user-enabled UV-C 84E. In general, the options 84A-84E may be selected by a user via user interface 17.

If the user-enabled HVAC option 84A is selected, the system 15 implements the step 85A, which includes running a heating cycle to a predetermined temperature determined by controller 15 or to a temperature based on user inputs (e.g., 70° F., 95° F., or 135° F.). The HVAC system 3 may be in recirculation mode during the heating cycle 85A (e.g., first powered door 13, FIGS. 1 and 2 is in position 13A to block fresh air). In recirculation mode, only recirculated air 9 flows through the HVAC system 3.

If a user selects the raised humidity option 84B, the system 15 implements humidity option of step 85B, which may include adding water vapor by supplying liquid water from reservoir 28 to achieve a preselected humidity level (e.g., 80 percent humidity). Controller 15 may implement closed-loop control by using measured humidity data from sensor 14A to thereby increase humidity to a preselected level, and maintain the humidity at the preselected level.

If the anti-microbial agent option 84C is selected, the system 15 adds an anti-microbial agent at step 85C. The anti-microbial agent may comprise a liquid that is supplied from reservoir 30, which may be mixed with water from reservoir 28. If the raised humidity option 84B is not selected, and the anti-microbial agent option 84C is selected, the anti-microbial agent may be added at step 85C without implementing step 85B. For example, the valve 40 may be closed by controller 15 to prevent flow of liquid water 32, while the valve 41 is opened by controller 15 to permit flow of anti-microbial fluid such as sanitizing agent 33. An amount of sanitizing agent introduced into the air in passenger space 2 may be selected to provide a predefined concentration of the sanitizing agent in the air in passenger in space 2.

If the UV-C option 84E is selected, at step 85E, the system 15 actuates UV-C light source 27. The UV-C light source may be intermittently actuated. For example, UV-C light source 27 may be actuated every 10 minutes for one minute. If the UV-C light source 27 is positioned in the passenger space 2, the system 15 may be configured to prevent actuation of UV-C light source 27 if the system 15 detects occupants in the vehicle at step 78 (FIG. 3). However, if the UV-C light source 27 produces UV light 27A that is confined to the HVAC system 3, the system 15 may be configured to implement UV-C cleaning 85E even if an occupant is detected at step 78.

Referring again to FIG. 4, at step 86, the system 15 may maintain the selected cleaning options (e.g., 85A-85E) for a specific period of time. The period of time may be manually selected at step 70 (FIG. 3) by a user via interface 17. Alternatively, the duration may be determined by the system (e.g., controller 15) based on predefined criteria such as current vehicle operating conditions, predicted pathogen resistance to the sanitizer, predicted (estimated) pathogen concentration in the geographic area of the motor vehicle, etc.

At step 87, the system 15 returns the vehicle temperature and humidity to comfortable levels. Step 87 may involve introducing fresh air into the passenger space 2 to reduce humidity, actuating the HVAC system to cool air in passenger space 2, etc.

At step 88, the system adds a deodorizer and/or fragrance to the passenger space 2, if this feature is enabled (e.g., a user selects this option using interface 17). As shown at 89, the scheduled cleaning cycle is then complete.

Motor vehicle 1 may include powered locks, powered latches, and other features to prevent vehicle entry. The door locks and latches may be disabled (locked) by controller 15 to prevent entry into motor vehicle 1 during the cleaning cycle 100B (see FIG. 4). Also, motor vehicle 1 may optionally include a wireless communication system (not shown) that is configured to provide a user with status updates by transmitting a signal to a user's smartphone or other device, to thereby alert a user that a cleaning cycle has been initiated, a cleaning cycle is in process, a notification that the cleaning cycle has been completed (or halted), and/or the length of time remaining for the cycle. The information may further include the specific cleaning parameters (e.g., steps 85A-85E) that were implemented for a particular cleaning cycle.

The system 15 may be configured to store cleaning cycle information, and utilize the stored information to implement or control additional cleaning cycles. For example, the system 15 may be configured to implement a cleaning cycle every 24 hours (e.g., between 2:00 a.m. and 3:00 a.m., or other time when a particular vehicle is not normally in use). Furthermore, the system 15 may be configured to automatically implement a cleaning (sanitizing) cycle if predefined criteria are satisfied. For example, the system 15 may be configured to implement a short cleaning cycle 70A (FIG. 3) if the motor vehicle 1 has been operated for at least 30 minutes and a user exits the vehicle 1 (e.g., the system detects the door opening and closing, and determines that the vehicle is not occupied).

Still further, the system 15 may also be configured to permit remote implementation of cleaning cycle 100 utilizing a smartphone, computer, or the like.

The system may also be configured to utilize artificial intelligence (AI) to control one or more aspects of a cleaning sanitizing cycle. For example, multiple types of algorithms and strategies may be utilized to learn and predict user preferences. In general, algorithms that use a supervised learning approach with low computational costs (e.g., regression algorithms) are preferred over time, and, due to evolving user preferences, more complex algorithms may be deployed using over-the-air updates to controller 15. However, if an AI algorithm is implemented, the system 15 is preferably configured to provide a user with control over the type and amount of personal information available to the AI.

The cleaning sanitizing cycle as implemented by the HVAC system may be designed to provide a targeted interior temperature and humidity level to neutralize specific pathogens. For example, the target humidity and temperature levels (and concentration of sanitizing agent) may be selected to disable or neutralize a specific pathogen or a plurality of pathogens. Similarly, the intensity and duration of light provided by UV-C light source 27 may also be selected and controlled to neutralize specific pathogens, or to more generally neutralize pathogens that are susceptible to UV-C light.

In general, the volume of liquid water 32 and the volume of liquid sanitizing agent 33 that are introduced during the cleaning sanitizing cycle are selected to provide a targeted humidity level and a target concentration of sanitizing agent in the air of passenger space 2. Similarly, the temperature of passenger space 2 may also be raised to a target temperature by the system 15. The temperature, humidity, and anti-microbial concentration levels are therefore selected to provide neutralization of a specific pathogen or various pathogens.

In some instances, a temperature of air in passenger space 2 may exceed a target temperature, such that heating is not required. The humidity may nevertheless be adjusted to account for interior temperatures that are above (or below) the target temperature. For example, if a target temperature is 80° and the vehicle interior is 100° (e.g., the vehicle is in the sun in a hot area), the system may determine that the target temperature has been exceeded, and may adjust the humidity to account for the actual measured temperature. For example, a lower humidity level may be required if an interior temperature exceeds a target temperature, and the target humidity may be adjusted to a lower level. Also, if a target temperature is exceeded due to ambient conditions, the system 15 may be configured to perform the cleaning cycle without reducing the temperature to the target temperature. In general, the target temperature for a cleaning cycle may comprise a minimum target temperature, such that the system 15 heats the air if required to meet the target temperature, but does not necessarily reduce the temperature if the interior air temperature of the vehicle exceeds the target temperature. However, in some cases, the system 15 may be configured to cool the air during a sanitizing cycle, if the target temperature (or a target temperature range) is exceeded.

The anti-microbial agent (sanitizing agent) may comprise virtually any compound suitable for neutralizing pathogens. Examples include isopropyl alcohol, ethyl alcohol, hydrogen peroxide, etc. The system may be configured to utilize different sanitizing agents and may be configured to adjust the amount (volume) of the sanitizing agent depending on the specific sanitizing agent used and/or other factors (e.g., the susceptibility of a specific pathogen to a specific sanitizing agent).

The HVAC system of the present disclosure is not limited to passenger spaces of vehicles. For example, the HVAC system may be configured to recirculate air through a trunk or cargo space of a vehicle to sanitize the cargo space.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor vehicle, comprising:

a passenger space;

a HVAC system including a heater having a heater core, an air conditioner having an evaporator that is upstream of the heater core, and ducts configured to cause air to flow in a downstream direction through the evaporator and then through the heater core and to supply air that has been heated and/or cooled by the heater and/or the air conditioner to the passenger space, wherein the HVAC system is configured to increase humidity of air in the HVAC system and to introduce a chemical sanitizing agent into air while the air is flowing through the HVAC system before the air is supplied to the passenger space, wherein the chemical sanitizing agent is introduced into air downstream of the evaporator by an outlet that is positioned downstream of the evaporator; and a controller configured to actuate the HVAC system to circulate humidified air containing the chemical sanitizing agent through the passenger space whereby the temperature of air in the passenger space, the humidity of air in the passenger space, and a concentration of the chemical sanitizing agent in the passenger space are selected and controlled to neutralize at least one known pathogen in the air in the passenger space.

2. The motor vehicle of claim 1, wherein:

the HVAC system includes a user interface that is configured to permit a user to schedule a sanitizing cycle that includes actuating the HVAC system to circulate humidified air containing the chemical sanitizing agent through the passenger space whereby at least one known pathogen in the air in the passenger space is neutralized.

3. The motor vehicle of claim 2, wherein:

the user interface permits a user to select one of a plurality of sanitizing cycles having non-equal time durations.

4. The motor vehicle of claim 1, wherein:

the HVAC system includes a fresh air inlet and a recirculation inlet; and the controller is configured to cause the HVAC system to conduct a sanitizing cycle only if the passenger space is not occupied, wherein the sanitizing cycle includes: a) causing air from the passenger space to flow into the recirculation inlet, b) actuating the heater to heat air flowing through the HVAC system, and c) causing the HVAC system to increase humidity of air flowing through the HVAC system and introduce the chemical sanitizing agent into air while the air is flowing through the HVAC system;

whereby, during a sanitizing cycle, a temperature and a humidity of air from the passenger space are increased while the air is flowing through the HVAC system, and the chemical sanitizing agent is introduced into the air while the air is flowing through the HVAC system, before the air is returned to the passenger space.

5. The motor vehicle of claim 1, wherein:

the chemical sanitizing agent comprises a liquid chemical sanitizing agent;

the sanitizing system includes a first reservoir for liquid water and a second reservoir for the liquid chemical sanitizing agent, wherein the reservoirs are fluidly connected to a liquid outlet that is located adjacent the heater core whereby liquid water from the first reservoir and the liquid chemical sanitizing agent from the second reservoir exit the liquid outlet and is heated by the heater core, thereby evaporating the liquid.

6. The motor vehicle of claim 5, wherein:
the liquid outlet is located adjacent an upstream side of the heater core.

7. The motor vehicle of claim 5, wherein:
the liquid outlet is configured to cause at least some liquid exiting the liquid outlet to contact the heater core.

8. The motor vehicle of claim 5, wherein:
the liquid outlet comprises an evaporating surface that is connected to the heater core by thermal conductor whereby the heater core heats the evaporating surface to evaporate liquid on the evaporating surface.

9. The motor vehicle of claim 5, including:
a fluid conduit fluidly connected to the first reservoir;
a first valve configured to control fluid flow through the first fluid conduit;
a second fluid conduit connected to the second reservoir;
a second valve configured to control fluid flow through the second fluid conduit;
and wherein the controller is configured to control the first and second valves to cause air in the passenger space to reach a predetermined humidity and a predefined concentration of sanitizing agent.

10. The motor vehicle of claim 5, including:
a valve configured to control flow of liquid from the first reservoir to the liquid outlet;
and wherein the controller is configured to open the valve and cause flow of liquid from the first reservoir to the liquid outlet when the heater core is actuated to heat air flowing to the passenger space.

11. A motor vehicle, comprising:
a passenger space;
a HVAC system including a heater, an air conditioner, and ducts configured to supply air that has been heated and/or cooled by the heater and/or the air conditioner to the passenger space, wherein the HVAC system is configured to increase humidity of air in the HVAC system and to introduce a chemical sanitizing agent into air while the air is flowing through the HVAC system before the air is supplied to the passenger space the HVAC system including an air outlet that provides air to the passenger space;
a controller configured to actuate the HVAC system to circulate humidified air containing the chemical sanitizing agent through the passenger space; and
a reservoir configured to hold a sanitizing liquid that includes the chemical sanitizing agent, and a fluid conduit connecting the reservoir to a mister positioned downstream from the heater and downstream from the air conditioner in the air outlet, wherein the mister is selected from the group consisting of ultrasonic misters and spray misters.

12. The motor vehicle of claim 1, wherein:
the passenger space comprises a passenger compartment;
the HVAC system is configured to introduce a fragrance and/or a deodorizing agent into air while the air is flowing through the HVAC system before the air enters the passenger compartment.

13. The motor vehicle of claim 1, wherein:
the passenger space comprises a passenger compartment;
the controller is configured to utilize measured temperature data and measured humidity data of air in the passenger compartment to control temperature and humidity of air in the passenger compartment.

14. The motor vehicle of claim 1, wherein:
the controller utilizes artificial intelligence (AI) to learn and predict user preferences, and wherein the controller is configured to utilize the user preferences to control at least one aspect of the HVAC system.

15. A method of sanitizing air in a passenger space of a motor vehicle utilizing a HVAC system of the motor vehicle, the method comprising:
measuring temperature and humidity of air in the passenger space to provide measured temperature and humidity data;
causing air to flow through the HVAC system and exit into the passenger space;
increasing one or both of temperature and humidity of air exiting into the passenger space utilizing the measured temperature and humidity data of air in the passenger space and predefined sanitizing criteria; and
introducing a chemical sanitizing agent into air while the air is flowing through the HVAC system before the air enters the passenger space whereby a concentration of the chemical sanitizing agent in the air in the passenger space is sufficient to neutralize at least one pre-identified pathogen in the air in the passenger space at the measured temperature and humidity.

16. The method of claim 15, wherein:
the passenger space comprises a passenger compartment;
the predefined sanitizing criteria includes a target temperature and a target humidity; and including:
causing the HVAC system to increase at least one of air temperature and humidity in the passenger compartment if at least one of the measured temperature and humidity data are less than a target temperature and a target humidity, respectively.

17. The method of claim 15, including:
utilizing the predefined sanitizing criteria to control an amount of the chemical sanitizing agent introduced into air while the air is flowing through the HVAC system.

18. The method of claim 17, wherein:
the predefined sanitizing criteria includes at least one of:
a) a pathogen susceptibility to the chemical sanitizing agent, b) an estimated amount of a pathogen present in the passenger space, c) a susceptibility of a passenger to a pathogen, d) a temperature of air in the passenger space, e) a humidity of air in the passenger space, or f) an estimated pathogen concentration in a geographic region of the vehicle.

19. The method of claim 15, wherein the chemical sanitizing agent comprises a liquid chemical sanitizing agent, and including:
utilizing a drip outlet adjacent to a heater core to introduce the liquid chemical sanitizing agent into air while the air is flowing through the HVAC system before the air enters the passenger space.

20. The method of claim 15, wherein the chemical sanitizing agent comprises a liquid chemical sanitizing agent, and including:
utilizing a mister positioned in a duct of the HVAC system adjacent an air outlet to introduce the liquid chemical sanitizing agent into air just before the air enters the passenger space.

* * * * *

UNITED STATES PATENT AND TRADEMARK OFFICE
CERTIFICATE OF CORRECTION

PATENT NO. : 11,718,142 B2
APPLICATION NO. : 16/953051
DATED : August 8, 2023
INVENTOR(S) : Pecchia et al.

It is certified that error appears in the above-identified patent and that said Letters Patent is hereby corrected as shown below:

On the Title Page

Item (54), and in the Specification, Column 1, Line 1, Title:
"APPARATUS AND METHOD FOR SANITIZING A VEHICLE INFERIOR" should be
--APPARATUS AND METHOD FOR SANITIZING A VEHICLE INTERIOR--.

Signed and Sealed this
Twenty-first Day of November, 2023

Katherine Kelly Vidal
*Director of the United States Patent and Trademark Office*